United States Patent [19]

Smith

[11] 4,181,814
[45] Jan. 1, 1980

[54] SPLICE CASE WITH GASKET AND CLOSURE MECHANISM THEREFOR

[75] Inventor: Donald J. Smith, Woodland Hills, Calif.

[73] Assignee: Preformed Line Products Company, Cleveland, Ohio

[21] Appl. No.: 821,568

[22] Filed: Aug. 3, 1977

[51] Int. Cl.² ............................................. H02G 15/18
[52] U.S. Cl. ......................................... 174/92; 174/93
[58] Field of Search ............................. 174/91, 92, 93; 138/164

[56] References Cited

FOREIGN PATENT DOCUMENTS 2158992  5/1973  Fed. Rep. of Germany .............. 174/92
7508247  1/1976  Netherlands ................................ 174/92

Primary Examiner—Thomas J. Kozma
Attorney, Agent, or Firm—Lyon & Lyon

[57] ABSTRACT

A cylindrical case for enclosing a cable splice is disclosed which includes a longitudinally split tubular closure member, two end members positionable at either end of the closure member, a gasket of resilient material extending the length of the longitudinal split in the closure member and about the two end member, and a channel member cooperating with upstanding ridges on the closure member at the longitudinal split to secure closure of the case. The gasket includes an elongate, resilient sealing element with an elongate rigid bar extending longitudinally therethrough. The bar includes formed ends which define a slot to receive a fastening element and a ground contact extending from the end of the gasket. Resilient sealing rods also extend laterally from the gasket to define sealing elements about the two end members of the splice case. The gasket is tapered as are the channel members and mechanism is provided on the closure member and on the channel members to enable a forcing of the closure members into interference fit on the case.

13 Claims, 9 Drawing Figures

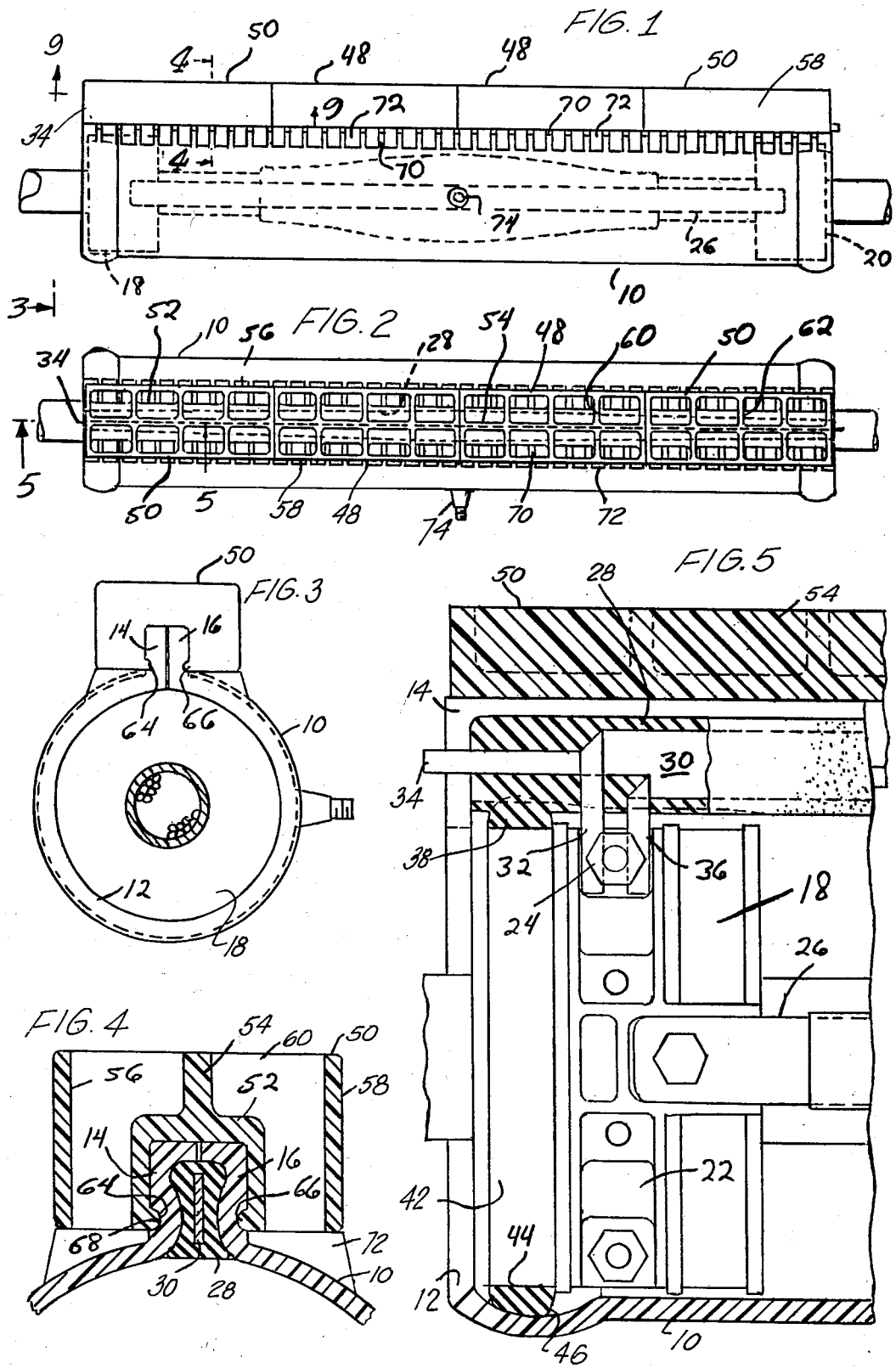

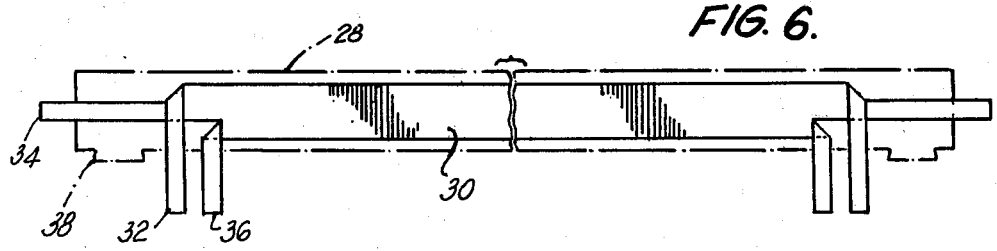
FIG. 6.
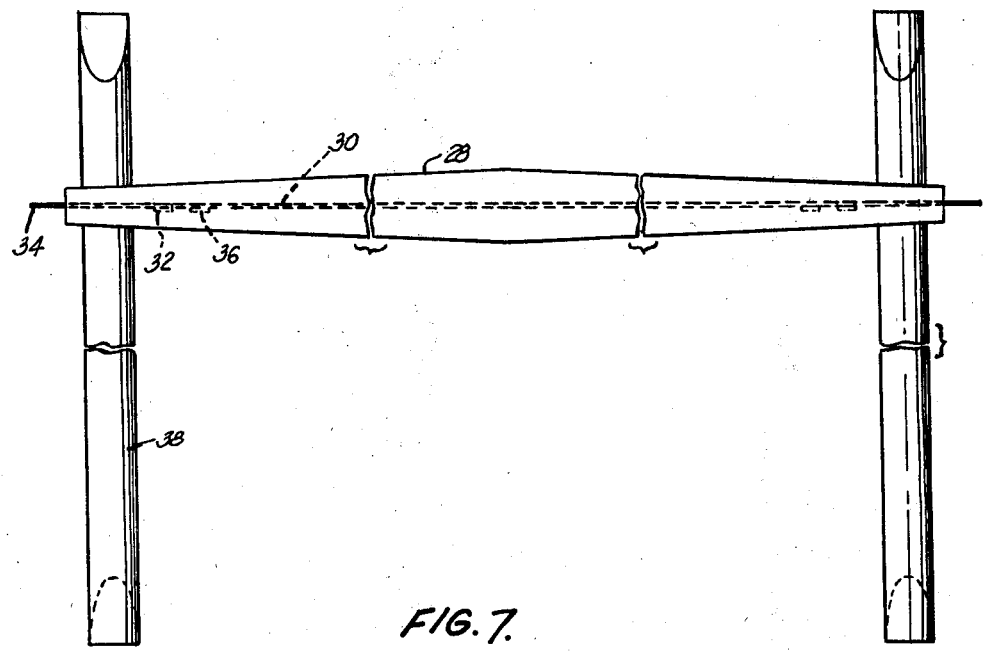
FIG. 7.
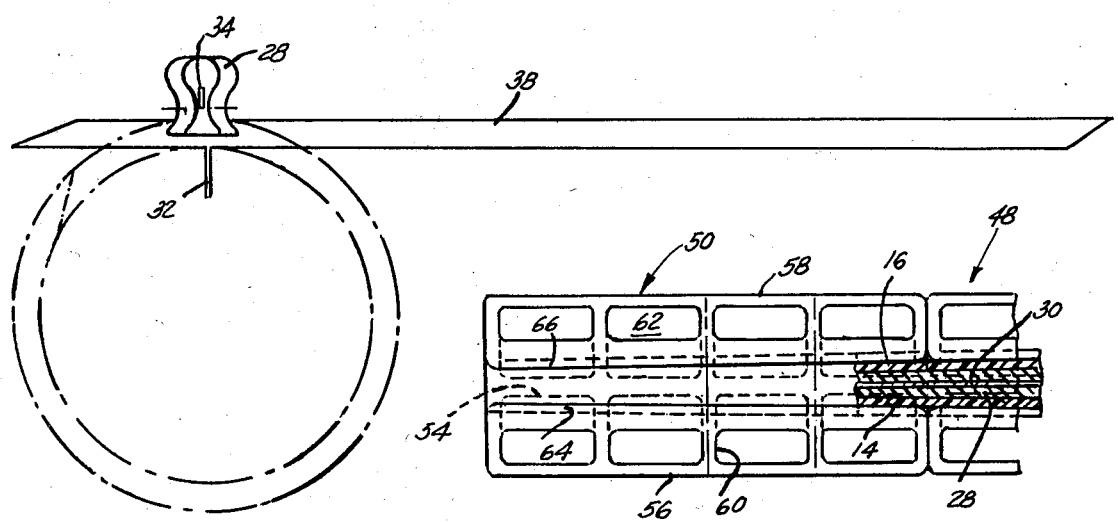
FIG. 8.
FIG. 9.

SPLICE CASE WITH GASKET AND CLOSURE MECHANISM THEREFOR

BACKGROUND OF THE INVENTION

This invention is directed to a case assembly and gasket therefor to enclose and seal a splice in a cable.

Splice cases for telephone and power lines which provide maximum protection against the environment have found increasing utility with the ever increasing use of underground installations. To prevent environmental intrusion, some systems employ air pressure in the cables and splice cases to create a flow from the enclosed equipment through any openings. This practice prevents moisture intrusion against the flow of air. However, it is also advantageous to minimize the amount of air leakage from the utility network to prevent significant consumption of compressed air and to insure against any requirement of high air flow to maintain adequate pressure throughout the system. Thus, the splice cases and other equipment are required to be air-tight.

In view of the foregoing requirements on the splice cases, a highly effective sealing means must be provided. At the same time, it is necessary to provide a system which is easily assembled in the field and not subject to any excessive possibility of installer error. Heretofore, a large number of case designs have been available which can provide effective sealing. However, most cases have employed complicated sealing mechanisms which have a high probability of installer error. Such cases have often been cylindrical in nature with one or more longitudinal splits and end members that both surround the incoming cable and form a seal with the cylindrical case. An example of an earlier splice case having an effective sealing mechanism is disclosed in U.S. Pat. No. 3,692,926.

One major problem with earlier designs has been the need for close tolerances and interference fits. These considerations add significantly to both the initial cost of the unit and assembly complexity in the field. To overcome an inability to simply and tightly close such cases, reliance has often been placed on extensive use of mastic. Use of mastic often requires substantial installer preparation and makes re-entry difficult. Foaming compounds and resins have similar disadvantages. On the other hand, mechanisms requiring close tolerances and interference fits are often easily damaged in the field where assembly must occur, are expensive to fabricate and may also require close attention to assembly.

SUMMARY OF THE INVENTION

The present invention is directed to a splice case assembly and gasket. The splice case is generally tubular with two cylindrical end members which can be positioned about incoming cables on either side of the splice. The tubular case is split longitudinally to facilitate installation. Thus, sealing is required along the longitudinal split and about the cylindrical end members.

A novel and highly effective gasket is provided which is easily positioned about the cylindrical end members, is structurally self-supporting on the cylindrical end members to remain in position during installation of the tubular case, and provides sealing for the longitudinal split in the case as well as around the cylindrical end members. The gasket material is quite soft to allow for positive sealing with low compressive forces and without mastic. At the same time, the gasket is structurally self-supporting because of a rigid bar extending therethrough. The bar is made to attach to each cylindrical end member in order that the gasket will remain fixed during assembly thereof about the end members and during assembly of the tubular case about the splice, end members and gasket. The fixing of the gasket in the splice case assembly and its structurally rigid nature greatly ease and simplify installation. Thus, installer error is far less likely. At the same time, the very soft nature of the gasket further insures completion of a successful seal because of its ability to yield under low compressive forces to fill all interstices. The gasket performance also advantageously enables large tolerances to be acceptable in the fabrication of the other components of the case.

The gasket is generally defined by an elongate member having integrally formed transverse rods. These rods form the sealing means about the cylindrical end members. The rods intersect the elongate member such that the upper surfaces of the rods meet the member in a nontangential relationship. This relationship insures that the soft material of the gasket will conform to the tubular case to form a tight seal at the intersection of the rods with the elongate member. Each resilient rod also has a continuous surface along the underside thereof to form an unbroken seal about the periphery of the cylindrical end members.

To achieve adequate interference fits for proper compression of the gasket, the gasket is tapered and tapered channel members are employed. A mechanism using a screwdriver allows forceful positioning of the channel members over the tapered gasket. The mechanism includes notches on the case and interstices in the channel members such that a screwdriver can be used to force the channel members longitudinally along the case and gasket. Thus, complicated assembly procedures as well as expensive components are avoided.

Accordingly, it is an object of the present invention to provide an improved splice case.

It is a further object of the present invention to provide an improved gasket for a splice case.

It is another object of the present invention to provide an improved closure mechanism for a splice case.

Other and further objects and advantages will appear hereinafter.

BRIEF DESCRIPTION OF THE DRAWINGS

FIG. 1 is a side view of an assembled splice case of the present invention.

FIG. 2 is a top view of an assembled splice case of the present invention.

FIG. 3 is an end view of the splice case of the present invention.

FIG. 4 is a detailed cross-sectional end view taken along line 4—4 of FIG. 1.

FIG. 5 is a detailed cross-sectional side view taken along line 5—5 of FIG. 2.

FIG. 6 is a side view of the rigid bar of the present invention.

FIG. 7 is a plan view of the gasket of the present invention.

FIG. 8 is an end view of the gasket of the present invention shown in its assembled configuration in phantom.

FIG. 9 is a detailed cross-sectional view taken along line 9—9 of FIG. 1.

DETAILED DESCRIPTION OF THE PREFERRED EMBODIMENT

Turning in detail to the drawings, a splice case is shown as including a cylindrical case or tubular closure member 10 which is advantageously of unitary construction. The case is rotationally molded and is conveniently of crosslinked polyethylene.

The cylindrical case 10 includes an inwardly extending annular flange 12 to help constrain the splice assembly and end members within the housing. A longitudinal split is provided in the case to provide lateral access and to allow for radial expansion of the case for placement over the splice and end members. At the longitudinal split in the case 10, upstanding ridges 14 and 16 define a gasket cavity and facilitate closure of the case. The upstanding ridges 14 and 16 are slightly flared apart on their inner surfaces such that the gasket cavity is narrower adjacent the inside of the case than it is outwardly thereof. This can best be seen in FIG. 3. The outermost ends of the upstanding ridges 14 and 16 extend inwardly to partially close off the gasket cavity for protection of the gasket.

Cylindrical end members 18 and 20 are positionable at either end of the cylindrical case 10. The end members 18 and 20 may be constructed in a manner similar to that shown in U.S. Pat. No. 3,692,926, the disclosure of which is incorporated herein by reference. Each end member is split in two for receipt of a cable. The members are of an easily molded plastic material and have a metal ring 22 which extends about each end member and is also split in two. To hold the metal ring 22 together, fasteners 24 extend across the mating portions thereof. The end members 18 and 20 are naturally sized to fit within the cylindrical case 10 when closed. As a gasket will provide a seal between the end members 18 and 20 and the cylindrical case 10, it is preferred that the end members fit loosely within the closed cylindrical case 10.

Extending between the end members 18 and 20 are bars 26. These bars help align the end members 18 and 20, protect a splice from external forces and act as a ground connection between end members.

The gasket is employed to seal both the longitudinal split in the cylindrical case 10 and the circumferential joint between the end members 18 and 20 and the inner side of the cylindrical case 10. The main body of the gasket is formed by an elongate, resilient sealing element 28. This sealing element 28 may be of neoprene or silicone rubber having a Shore hardness around 12.

The width of the elongate sealing element 28 is varied to form a taper. The taper is designed to give a maximum width at the center of the element. By designing the gasket in this manner, channel members (described below) may be wedged from both sides toward the middle. The ends, being equal in width, accommodate identical end members 18 and 20. The gasket is also sized to give an interference fit with the cylindrical case 10 when the case is fully assembled by more than filling the gasket cavity. The cylindrical closure member 10 is generally flexible enough at the upstanding ridges 14 and 16 so that it is not imperative to construct the ridges 14 and 16 to define a tapered gasket cavity. Final closure will cause the ridges 14 and 16 to conform to and compress the gasket. Thus, an interference fit is provided when the longitudinal split is held in the closed position. The sealing element 28 is also of sufficient length to run substantially from one inwardly extending annular flange 12 to the other.

Positioned centrally in the elongate, resilient sealing element 28 is an elongate, rigid bar 30. The elongate, rigid bar 30 is of sufficient rigidity to support the sealing element 28 when held at either end. The bar 30 is preferably conductive and is so positioned, as can best be seen in FIG. 3, such that it interferes very little with the compressive qualities of the sealing element 28 between the upstanding ridges 14 and 16.

At either end of the elongate, rigid bar 30, the bar is split longitudinally into three tines 32, 34, and 36. The outer tines 32 and 36 are crimped over such that they lie perpendicular to the elongate, rigid bar 30 to form a notch therebetween. This notch between the outer tines 32 and 36 is designed for cooperation with the fasteners 24 as can best be seen in FIG. 4. The inner tine 34 is allowed to extend along the longitudinal direction of the rigid bar 30 such that it extends from the end of the sealing element 28. Thus, a ground terminal is provided where necessary.

Integral with the resilient sealing element 28 are two elongate, resilient sealing rods 38 and 40. These sealing rods 38 and 40 are oriented perpendicular to the sealing element 28 and are spaced such that they mate with channels 42 on the end members 18 and 20. The sealing rods 38 and 40 are also of sufficient length to encircle the end members 18 and 20 such that a first surface 44 thereof will lie in juxtaposition with the perimeter of the end members 18 and 20 at the channels 42. This first surface 44 does not intersect the body of the sealing element 28; and thus compression may be obtained continuously about the perimeter of the end members 18 and 20. A second surface 46, diametrically opposite the first surface 44 is caused to intersect the body of the sealing element 28 such that a tight seal can be obtained about the inner side of the cylindrical case 10, particularly adjacent the sealing element 28.

To facilitate assembly, the sealing rods 38 and 40 include beveled ends forming extended flat surfaces which may be bonded together as seen in phantom in FIG. 7. Ten-second air drying glue is commercially available for the bonding of the ends of the sealing rods 38 and 40 one to the other.

To close and compress the upstanding ridges 14 and 16 together with the gasket therebetween, rigid channel members are employed. Four such channel members are used in the disclosed embodiment; but any convenient number may be used. The two inner channel members 48 are identical and the two outer channel members 50 are identical. However, inner channel members 48 have a wider channel than the outer channel members 50 because of the tapered nature of the elongate sealing element 28.

The channel members 48 and 50 are molded structural plastic. A central channel element 52 extends the length of each member 48 and 50. A structural ridge 54 extends upwardly from the channel element 52 along the length of each channel member 48 and 50. Side elements 56 and 58 also extend the length of the members 48 and 50. Between the side elements 56 and 58 and the central ridges 54, webs 60 extend to define interstices 62 therebetween.

The channel defined by the channel element 52 is tapered at a similar angle to that of the elongate sealing element 28 and is of a width which will result in interference between the channel element 52 and the upstanding ridges 14 and 16 with the elongate sealing element 28 in place. This interference is to occur before either inner channel member 48 reaches the center of the cylindrical case 10. Thus, compression is assured by further forcing of the inner channel members 48 toward the center. The same considerations are applicable to the outer channel members 50 as they approach the final positions of the inner channel members 48.

Each channel element 52 includes inwardly extending flanges 64 and 66 at the outermost edge of the channel. These flanges cooperate with undercut grooves 68 located at the base of the outer side of the upstanding ridges 14 and 16. The flanges prevent facile lateral extraction of the channel members 48 and 50.

Adjacent the upstanding ridges 14 and 16 on the cylindrical case 10, notches 70 are defined by ribs 72 extending transversely to the longitudinal split in the case 10. The notches 70 and the interstices 62 define a mechanism for forcing the channel members 48 and 50 into a tight interference fit on the upstanding ridges 14 and 16. A screw driver or other similar tool may be positioned through an interstice 62 and forced against a side of a notch 70 below to move the channel member along the upstanding ridges 14 and 16.

To provide this forcing mechanism, ribs 72 are disposed such that the notches 70 and the ribs 72 are positioned adjacent the interstices 62 on the channel members 48 and 50. The pitch of the ribs 72 is other than an integral multiple of the pitch of the interstices 62. In this way, some of the interstices 62 will be properly aligned with some of the notches 70 with the channel members 48 and 50 in any position on the upstanding ridges 14 and 16 for tightening the channel members 48 and 50.

To assemble the splice case of the present invention, the splice is first completed and the end members 18 and 20 may be positioned about the cables. The bars 26 are positioned to extend between the end members 18 and 20 to insure proper spacing thereof. Once so positioned, the gasket is placed on the end members 18 and 20 and secured by means of cooperation between tines 32 and 36 with the fasteners 24 of the end members 18 and 20. Next, the sealing rods 38 and 40 are wrapped about the end members and glued together. The cylindrical case 10 is then radially expanded and positioned over the assembly such that the gasket is positioned between the upstanding ridges 14 and 16. The upstanding ridges 14 and 16 are then compressed and the rigid channel members 48 and 50 are slid into position. The inner channel members 48 are first positioned and forced by means of a screw driver employed in a prying action toward the center of the upstanding ridges 14 and 16. Next the outer channel members 50 are positioned in a similar manner. Testing of the integrity of the seals may be accomplished by pumping air into the case through valve 74 and checking for leaks in a conventional manner.

To provide an example only of a preferred design according to the principles set forth herein, the following dimensions are set forth. The cylindrical case 10 has an overall length of 66.4 cm. (26 ⅛ in.) and a nominal outside diameter of 11.2 cm. (4.4 in.) with a wall thickness of 0.48 cm. (3/16 in.).

The elongate, resilient sealing element 28 has a nominal width of 1.91 cm. (¾ in.) at the center and 0.95 cm. (⅜ in.) at each end. The heighth of the elongate, resilient sealing element 28 is 2.24 cm. (⅞ in.) and its length is 66 cm. (26 in.). The elongate, resilient sealing rods 38 and 40 are semicircular in cross section with a diameter of 1.27 cm. (½ in.). The heighth of the upstanding ridges 14 and 16, as measured from the center of the undercut grooves 68, is 1.65 cm. (0.650 in.). The channel members 48 and 50 are 6.6 cm. (2.6 in.) wide, approximately 16.5 cm. (6.5 in.) long and 3.8 cm. (1.5 in.) high overall. The channel through the inner channel member 48 is 1.96 cm. (0.77 in.) high and tapers from a width at the outer end thereof of 2.26 cm. (0.890 in.) to a width at the inner end thereof of 2.77 cm. (1.09 in.). The width of the channel through the outer channel member 50 varies similarly from 2.26 cm. (0.890 in.) at the inner end thereof to 1.75 cm. (6.90 in.) at the outer end thereof. The inwardly extending flanges 64 and 66 are semicircular with a radius of 0.254 cm. (0.100 in.).

The webs 60 between interstices 62 are 0.508 cm. (0.200 in.) and have a pitch of 3.96 cm. (1 9/16 in.). The notches 70 defined by ribs 72 are 0.475 cm. (0.187 in.) wide and have a pitch of 1.43 cm. (0.562 in.). The minimum width of the interstices 62 is 1.27 cm. (0.500 in.).

Thus, a secure and easily assembled splice case is provided by the present invention. The self-supporting but soft gasket is easily positioned in the case and the channel members are readily forced onto the case with a screwdriver. The resulting closure is tightly sealed without significant possibility of installer error. The components are not required to exhibit close dimensional control; and therefore, the closure is relatively inexpensive.

While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A gasket for a substantially cylindrical case having a longitudinally split, tubular closure member and cylindrical end members positionable within the tubular closure member, said gasket comprising
   an elongate, resilient sealing element sized to fit in interference within the longitudinal split of the tubular closure member when assembled;
   an elongate rigid bar extending longitudinally through said sealing element to provide structural rigidity to said sealing element; and
   elongate, resilient sealing rods integral with said elongate sealing element adjacent either end of said elongate sealing element and extending transversely thereto, each said sealing rod including a first surface extending continuously along said sealing rod and being flexible to wrap about the cylindrical end member with said first surface in juxtaposition with the perimeter of the cylindrical end member.

2. The gasket of claim 1 wherein said elongate, resilient sealing rods further include a second surface dimensionally opposite said first surface, said second surface intersecting said sealing element not tangentially.

3. The gasket of claim 1 wherein said rigid bar extends from either end of said elongate, resilient sealing element to provide ground terminals, said bar being conductive.

4. The gasket of claim 1 wherein each end of said elongate rigid bar is split longitudinally to define three tines, the outer ones of said tines being crimped over perpendicular to said elongate rigid bar to form a notch for attachment to the adjacent cylindrical end member, the inner one of said tines extending from the end of said elongate, resilient sealing element.

5. The gasket of claim 1 wherein either end of each said rod is chamfered to form corresponding, enlarged mating surfaces for bonding said ends together about the cylindrical end member.

6. The gasket of claim 1 wherein said sealing element is tapered such that said sealing element is wider at the middle thereof than at either end thereof.

7. A gasket for a substantially cylindrical case having a longitudinally split, tubular closure member and cylindrical end members positionable within the tubular closure member, said gasket comprising
    an elongate, resilient sealing element sized to fit in interference within the longitudinal split of the tubular closure member when assembled; and
    an elongate rigid bar extending longitudinally through said sealing element to provide structural rigidity to said sealing element, said elongate rigid bar being split longitudinally to define three tines, the outer one of said tine being crimped over perpendicular to said elongate rigid bar to form a notch for attachment to the adjacent cylindrical end member, the inner one of said tines extending from the end of said elongate, resilient sealing element.

8. A substantially cylindrical splice case comprising
    a longitudinally split, tubular closure member;
    cylindrical end members positionable within said tubular closure member; and
    a gasket including an elongate, resilient sealing element sized to fit in interference within said longitudinal split of said tubular closure member when assembled, an elongate rigid bar extending longitudinally through said sealing element to provide structural rigidity to said sealing element, and elongate, resilient sealing rods integral with said elongate sealing element adjacent either end of said elongate sealing element and extending transversely thereto, each said sealing rod including a first surface extending continuously along said sealing rod not intersecting said sealing element and being flexible to wrap about the cylindrical end member with said first surface in juxtaposition with the perimeter of said cylindrical end member.

9. The splice case of claim 8 wherein said tubular closure member has a longitudinal split and upstanding ridges on said closure member along either side of said longitudinal split, said upstanding ridges defining an elongate gasket cavity therebetween when brought into proximate and substantially parallel relationship and the splice case further comprises at least one channel member to hold said upstanding ridges in interference fit with said resilient sealing element when positioned therebetween, each such channel member having a channel therethrough positionable over said upstanding ridges.

10. The splice case of claim 9 wherein said sealing element is tapered such that said sealing element is wider at the middle thereof than at either end thereof and said channel of each such channel member is tapered along its length.

11. The splice case of claim 10 wherein said tubular closure member further includes notches transverse to said split, located proximate to said upstanding ridges and wherein each such channel member includes interstices extending to said notches when said channel member is positioned on said tubular closure member, said interstices being mutually spaced at a pitch other than an integral multiple of the pitch of said notches.

12. A substantially cylindrical splice case comprising
    a tubular closure member having a longitudinal split,
        upstanding ridges on said closure member along either side of said longitudinal split, said upstanding ridges defining an elongate gasket cavity therebetween when brought into proximate and substantially parallel relationship and each said ridge havig an undercut groove on the outer side thereof;
    an elongate resilient sealing element sized to fit in interference within said elongate gasket cavity, said sealing element being tapered such that said sealing element is wider at the middle thereof than at least one end thereof; and
    at least one channel member having a channel therethrough and inwardly extending flanges such that each of such channel members is positionable over said upstanding ridges with said flanges in said undercut grooves to hold said upstanding ridges in interference fit with said resilient sealing element when positioned therebetween, said channel being tapered along its length.

13. The substantially cylindrical splice case of claim 12 wherein said tubular closure member includes notches transverse to said split, located proximate to said upstanding ridges and wherein each such channel member includes interstices in each such channel member extending to said notches when said channel member is positioned on said tubular closure member, said interstices being mutually spaced at a pitch different from that of said notches.

* * * * *